(12) United States Patent
Gross et al.

(10) Patent No.: US 12,547,612 B2
(45) Date of Patent: Feb. 10, 2026

(54) ATOMIC AND INCREMENTAL TARGET STATE DEFINITIONS FOR DATABASE ENTITIES

(71) Applicant: Snowflake Inc., Bozeman, MT (US)

(72) Inventors: Florian Gross, Berlin (DE); Martin Hentschel, Berlin (DE); Vincent Raudszus, Berlin (DE); Stefan Richter, Berlin (DE); Tom Henri Wollnik, Potsdam (DE)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/585,431

(22) Filed: Feb. 23, 2024

(65) Prior Publication Data

US 2025/0272277 A1    Aug. 28, 2025

(51) Int. Cl.
*G06F 16/23* (2019.01)
*G06F 16/21* (2019.01)
*G06F 16/245* (2019.01)

(52) U.S. Cl.
CPC ........ *G06F 16/2379* (2019.01); *G06F 16/213* (2019.01); *G06F 16/2365* (2019.01); *G06F 16/245* (2019.01)

(58) Field of Classification Search
CPC .. G06F 16/2379; G06F 16/245; G06F 16/213; G06F 16/2365
See application file for complete search history.

(56) References Cited

U.S. PATENT DOCUMENTS

| | | | |
|---|---|---|---|
| 11,874,822 B1* | 1/2024 | Singh | G06F 16/2315 |
| 2007/0294312 A1* | 12/2007 | Seshadri | H04L 41/024 |
| 2017/0116241 A1* | 4/2017 | Kumar | G06F 16/214 |
| 2021/0227024 A1* | 7/2021 | Glass | G06F 9/5022 |
| 2021/0365440 A1* | 11/2021 | Pople | G06F 16/215 |
| 2022/0067029 A1* | 3/2022 | Murthy | G06F 16/273 |

OTHER PUBLICATIONS

Raudszus, Vincent, "DevOps in Snowflake How Git and Database Change Management enable a file based object lifecycle", medium.com, (Nov. 2016), 18 pages.
Yaseen, Ahmad, "Create or Alter statement in SQL Server", [Online]. Retrieved from the Internet: https: www.mssqltips.com sqlservertip 4640 create-or-alter-statement-in-sql-server, (Accessed online Apr. 9, 2024), 3 pages.

* cited by examiner

*Primary Examiner* — Courtney Harmon
(74) *Attorney, Agent, or Firm* — Schwegman Lundberg & Woessner, P.A.

(57) ABSTRACT

Techniques for creating and modifying database entities, such as tables, tasks, etc., using declarative statements are described. Declarative statements specify a target state of the entity without specifying specific actions. The techniques described herein apply changes to the database entity atomically and incrementally.

15 Claims, 6 Drawing Sheets

ATOMIC AND INCREMENTAL TARGET STATE DEFINITIONS FOR DATABASE ENTITIES

TECHNICAL FIELD

The present disclosure generally relates to data systems, such as databases, and, more specifically, to making changes to database entities.

BACKGROUND

Data systems, such as database systems, may be provided through a cloud platform, which allows organizations and users to store, manage, and retrieve data from the cloud. Database entities, such as tables, can be modified. In conventional systems, imperative commands, such as ALTER, are used to modify a table. However, these imperative commands suffer from significant disadvantages, such as lack of atomicity if multiple ALTERs are run outside of a DDL-compatible database transaction.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for creating and modifying database entities, such as tables, tasks, etc., using declarative statements. Declarative statements specify a target state of the entity without specifying specific actions. The techniques described herein apply changes to the database entity atomically and incrementally. Atomicity refers to making a set of changes to an entity altogether in a single transaction so that the set of changes is visible to the user at the same time. Multiple read and write operations can be committed in one logical batch. No intermediate changes are visible to the user. Incremental refers to preserving existing data and definitions (e.g., privileges) of the entity when applying the changes.

Figure 1:
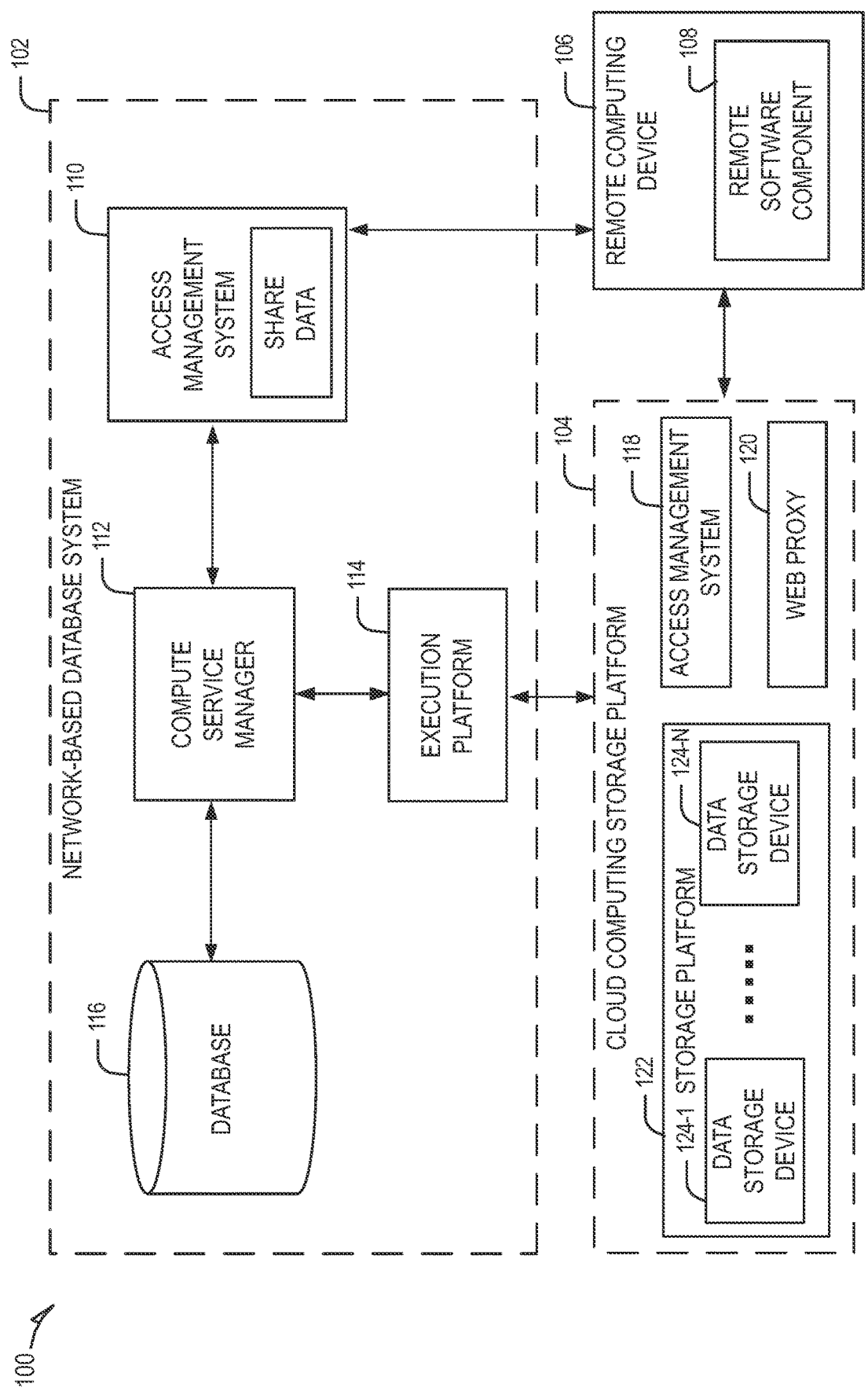
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another)

depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
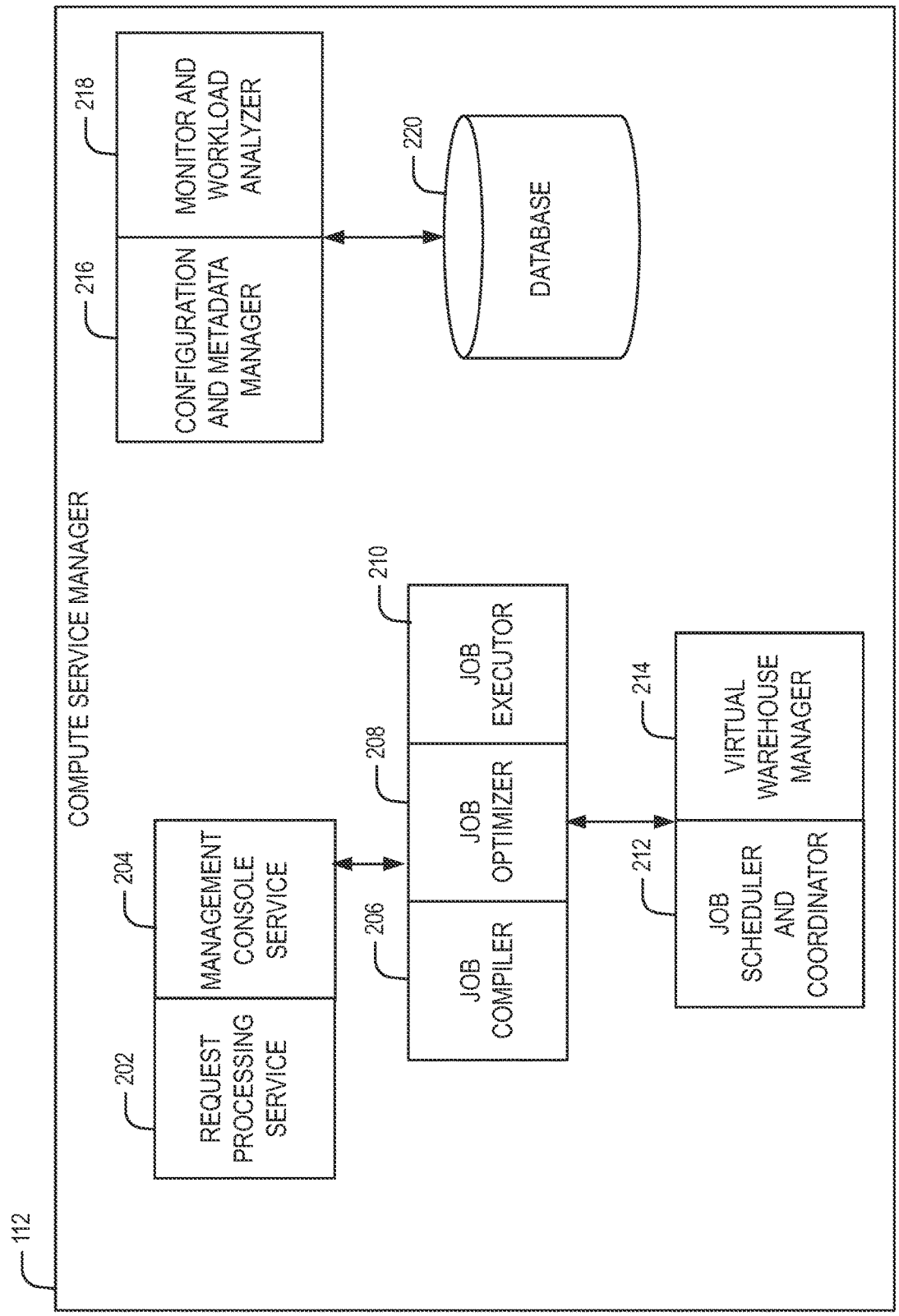
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
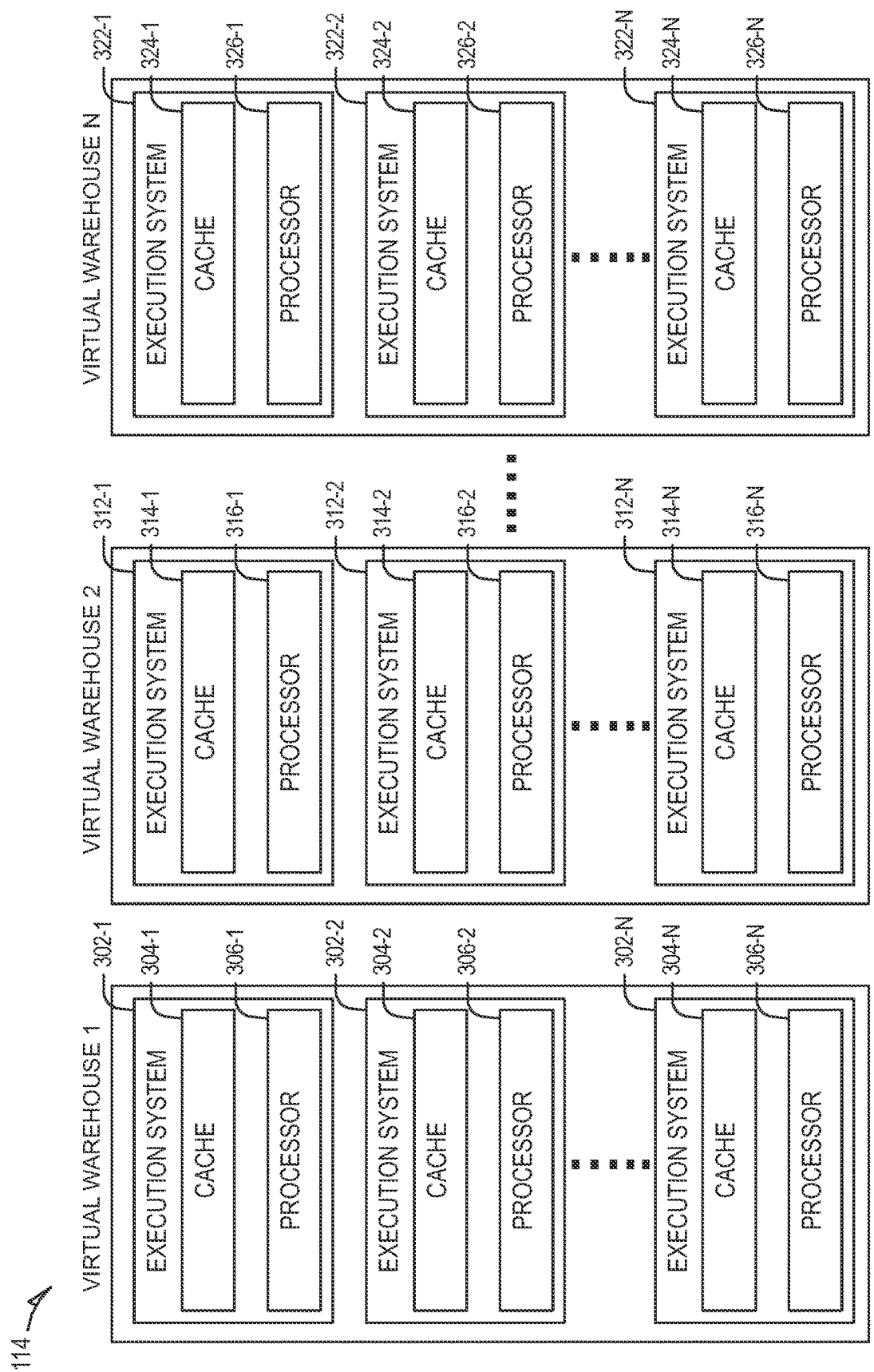
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Tables stored in the data system using the techniques described above are stateful database entities. Typically, to make changes to stateful database entities (e.g., tables, tasks), a database system employs one or more imperative statements. An imperative command instructs the system to perform a specific action. An "alter" command is an example of an imperative statement. For example, to delete a column "b" from an existing table, an alter command to delete the column "b" can be used.

However, imperative statements suffer from limitations and drawbacks. For example, the issuer of the imperative statement must typically have knowledge of the current state of the database entity. In the example above, the issuer must know that the table currently includes a column "b"; otherwise, an error may be caused by the execution of the alter command to delete a column b.

Next, techniques for creating and modifying stateful entities, such as tables, tasks, etc., using declarative statements are described. Declarative statements specify a target state of the entity without specifying specific actions. Examples of declarative statements (e.g., declarative SQL commands) are described in further detail below. The techniques described herein apply changes to the stateful entity in an atomic and incremental manner. Atomicity refers to making all changes to an entity altogether in a single transaction so that all changes are visible to the user at the same time. Multiple read and write operations can be committed in one logical batch. No intermediate changes are visible to the user. Incremental refers to preserving existing data, associations (e.g., policy associations, tag associations), and definitions (e.g., privileges) of the entity when applying the changes.

Figure 4:
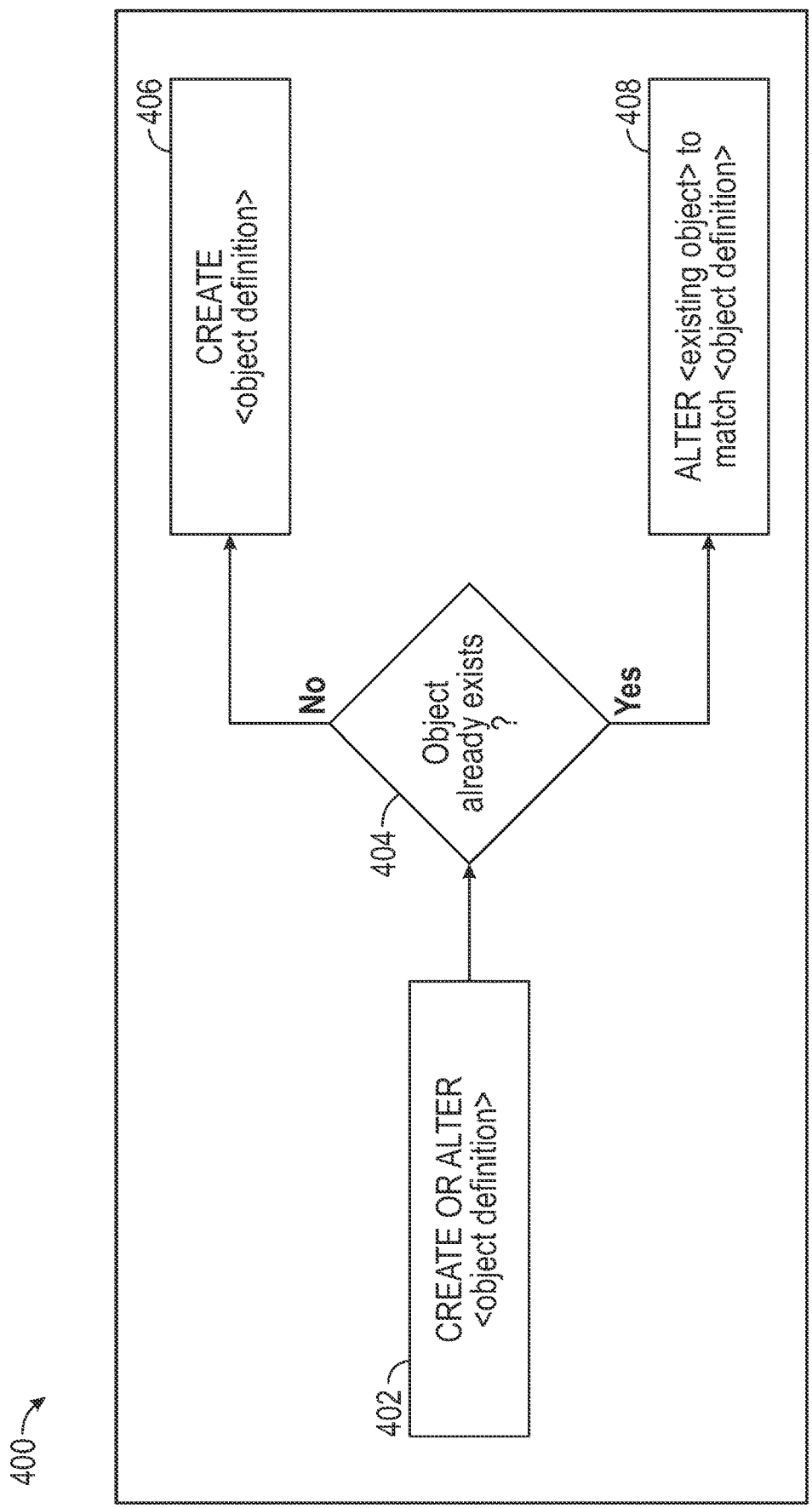
FIG. 4 is a flow chart illustrating a method for processing a "CREATE OR ALTER" command, according to some example embodiments.

In some examples, a new command "CREATE OR ALTER" can be used as a declarative statement to perform the techniques described. FIG. 4 illustrates a method 400 for processing a "CREATE OR ALTER" command, according to some example embodiments.

At operation 402, a "CREATE or ALTER" command is received by the data system. For example, the "CREATE or ALTER" command is received by a compute service manager described above (e.g., compute service manager 112). The command may include an object definition, which corresponds to a target state of the object. An example can be a Table t with two columns a and c where both columns are for integer values (e.g., CREATE OR ALTER TABLE t (a int, c int)).

At operation 404, the data system checks if the object specified in the declarative statement already exists. For example, the compute service manager may check if the object (e.g., table t in the example above) already exists.

At operation 406, if no such object already exists, the data system creates the object based on the object definition. In the example above, the data system may create table t with columns a and c as specified and store the table in one or more storage devices described above (e.g., data storage devices 124-1 to 124-N). Also, the data system may store metadata properties for the new table t in a metadata database. The metadata database can be provided as a transactional database (e.g., FoundationDB (FDB)) and includes key-value stores.

At operation 408, if the object in the command already exists in the data system, the data system alters the existing object to match the object definition in the command. Techniques to perform the alterations in an atomic and incremental manner are described next.

Figure 5:
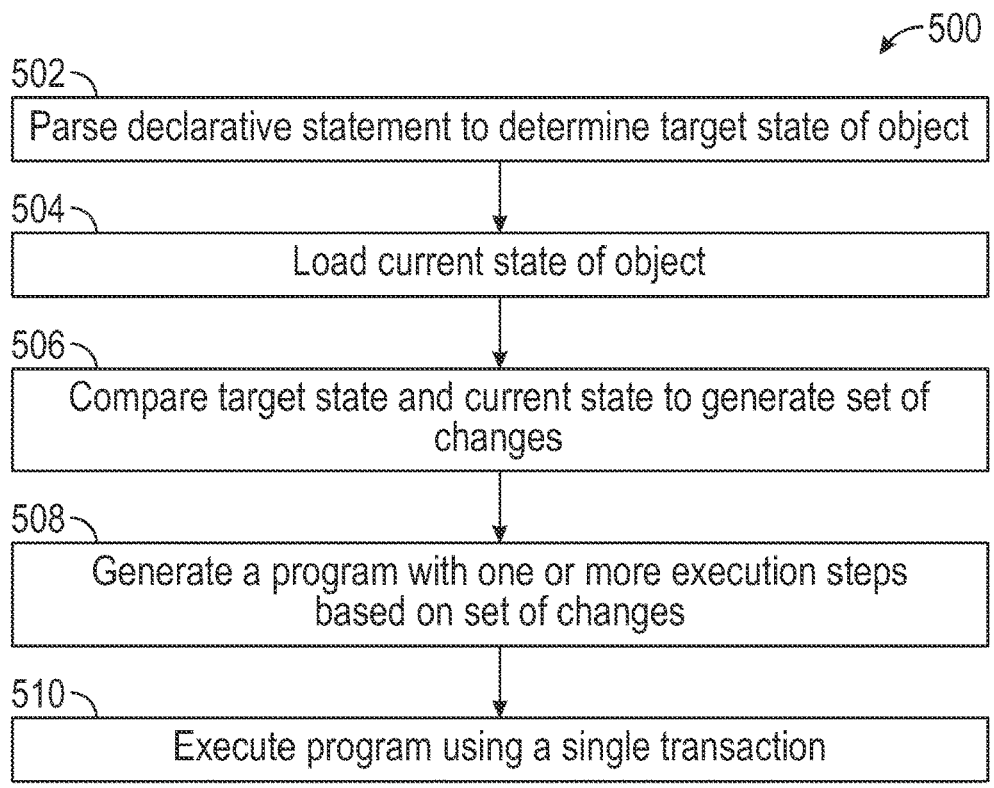
FIG. 5 is a flow chart illustrating a method for performing alterations to a stateful entity based on a declarative statement, according to some example embodiments.

FIG. 5 illustrates a method 500 for performing alterations to a stateful entity based on a declarative statement, according to some example embodiments. When discussing method 500 below, the example described above of "CREATE OR ALTER TABLE t (a int, c int)" will be used to illustrate certain operations; this is a non-limiting example for illustration purposes only.

At operation 502, the declarative statement is parsed to determine a target state of the object. The declarative statement may include an object definition. The object definition in the declarative statement can be a logical representation of the target state. In the example above, "TABLE t (a int, c int)" is the object definition. The declarative statement is parsed and represented as a program object (e.g., JAVA object) including the target state.

At operation 504, the current state of the object is loaded. For example, the current state of the object can be retrieved from the metadata database. For example, data persistent objects (DPOs) for the object can be retrieved from the metadata database to determine the current state of the object. In the example above, the DPO(s) for Table t can indicate the current status of table t as including two columns A and B taking integer values (e.g., TABLE t (a int, b int)). The table t may correspond to an entry in the key value store of the metadata database. For example, an entry may correspond to the table with table ID, name, and property set. One or more entries may correspond to the columns for the table with column name and property set.

At operation 506, the target state and current state of the object is compared to generate a set of changes to bring the current state of the object to the target state. In the example above, the set of changes may include dropping column b and adding new column c.

At operation 508, the data system (e.g., compute service manager) may generate a program including one or more execution steps for making the set of changes. In the example above, the program may include two execution steps of: (1) add column c, and (2) drop column b.

At operation 510, the program including one more execution steps is executed in an atomic manner. The one or more execution steps are performed in one transaction with the metadata database. All changes in the execution steps are committed at the same time in the single transaction, i.e., single transaction in the metadata database.

Performing the execution steps in one transaction makes all changes in the execution steps to the object visible at one time. No intermediate changes are revealed to the user. If there is an error with any execution steps, then none of the changes are made to the execution steps and hence no unwanted intermediate states of the table are revealed to the user.

The following scenario highlights the advantages of using a single transaction where all changes are committed at the same time, as described herein. In the example above, consider the two execution steps are performed separately using imperative statements, such as Alter commands, which are executed individually with each step having its own set of transactions with the metadata database. In this scenario, the first imperative statement of adding column c was successful and that change of adding column c to table t was committed. Now, consider an error occurred in the execution of the second imperative statement of dropping column b. Because of the error, the state of table t visible to the user now becomes an intermediate state of including three columns of a, b, and c (i.e., without the removal of column b). In contrast, using the techniques above, if the second execution step of dropping column b fails, then the change in the first execution step is not committed because all changes are committed together in a single transaction. In this case, no changes would be committed. Therefore, table t remains in its original state.

Figure 6:
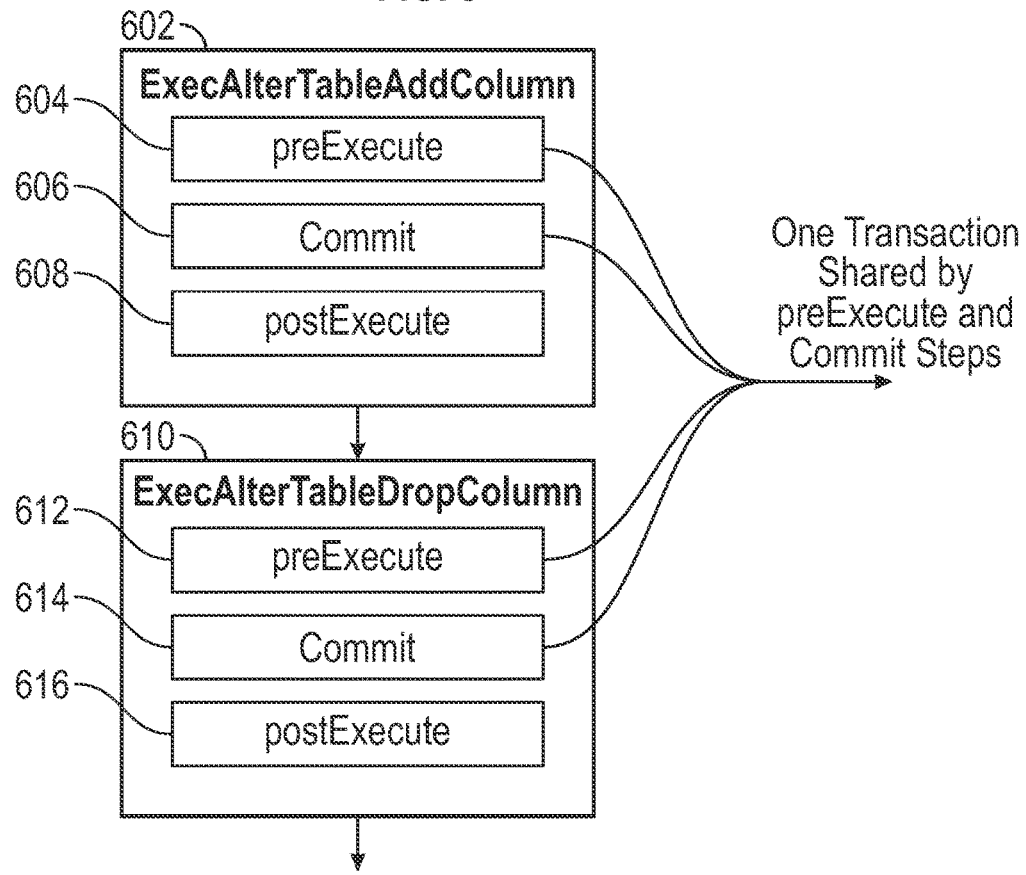
FIG. 6 is a block diagram illustrating transaction sharing of a plurality of execution steps, according to some example embodiments.

FIG. 6 illustrates transaction sharing of a plurality of execution steps, according to some example embodiments. A first execution step 602 is provided. The first execution step 602, in this example, corresponds to adding a column to a table ("ExecAlterTableAddColumn"). The first execution step 602 includes a preExecute component 604, a commit component 606, and a postExecute component 608. The preExecute component 604 may include validation and other pre-execution operations. The commit component 606 may perform the change in the execution step, such as adding the column in this example. The postExecute component 608 may include cleanup operations.

A second execution step 610 is also provided. The second execution step 610, in this example, corresponds to dropping a column from the table ("ExecAlterTableDropColumn"). The second execution step 610 also includes a preExecute component 612, a commit component 614, and a postExecute component 616. The preExecute components 604, 612 and the commit components 608, 614 interact with the metadata database thus involve corresponding transactions with the metadata database. The postExecute components 608, 616 do not interact with the metadata database to perform their respective functions and thus do not involve transactions with the metadata database.

Typically, in conventional systems, each operation in the preExecute component 604 (e.g., validation) and the commit component 606 in the first execution step 602 would have their own respective transactions with the metadata database. That is, the preExecute component 604 may involve multiple transactions with the metadata database, and the commit component 606 may involve an additional transaction with the metadata database. Likewise, each operation in the preExecute component 612 (e.g., validation) and the commit component 614 in the second execution step 610 would also have their own respective transactions with the metadata database. Hence, multiple transactions would be performed for the first and second execution steps 602, 610.

In contrast with transaction sharing, the preExecute component 604 and the commit component 606 in the first execution step 602 and the preExecute component 612 and the commit component 614 in the second execution step 610 share a single transaction with the metadata database. The changes with first execution step 602 and the second execution step 610 are committed using a single transaction and are visible to the user at the same time. The example of FIG. 6 shows two execution steps, but the transaction-sharing techniques described herein can be used with any number of execution steps.

The use of imperative statements to effectuate changes in a database entity, as described herein, can be used to make changes to different instances of the database entity more easily. For example, a table t can be stored in a first database (db1) and first schema (schema1). Another instance of table t, such as a backup version, can be stored in a second database (db2) and second schema (schema2). To bring the two tables into the same target state using conventional imperative statements would require ascertaining current states of both tables, which can be different, and then crafting corresponding imperative statements for each table. However, using the techniques described herein, the same declarative statement can be used to bring both tables to the same target state even if the current states of the tables are different. For each table instance, the target state defined in the declarative statement is compared to the current state and a program including one or more execution steps is generated and executed using a single transaction. Therefore, making changes to different instances of the same database entity is made much easier for the user using the techniques described herein.

Continuing with the example above, consider a second instance of table t being stored in db2.schema2 and has four columns a, b, c, and d unlike the first instance of table t stored in db1.schema1, which has columns a and b. The same declarative statement "CREATE OR ALTER TABLE t (a int, c int)" can be used for bringing both instances of table t to the target state. For the first instance of table t, the data system may drop column b and add column c using a series of execution steps in a single transaction to attain the target state as described above. For the second instance of table t, the data system may drop column b and drop column d in a single transaction to attain the target state as described above.

The examples above were described using a table as the stateful database entity; however, the techniques described herein can be used with different types of stateful database entities. For example, the techniques can be used for tasks ("Create or Replace Task"). A task can be a visible SQL object. For example, a task can be used to perform certain operations on a schedule, such as periodically refreshing a materialized view, auto-ingestion from a designated storage location, etc. A task may include a set of properties, such as warehouse, schedule, configuration, session parameters, timeout values, etc. A declarative statement defining a target state (e.g., property values) of the task can be used to make alteration of a task, as described above. The changes to the task can be effectuated in a single transaction, as described above.

As described above, the alterations to stateful database entities are made in an incremental manner. Existing data—or more generally: existing state—in the database entity is preserved when making alterations. Grants, privileges, policy associations, and tag associations attached to the database entity are also preserved.

Figure 7:
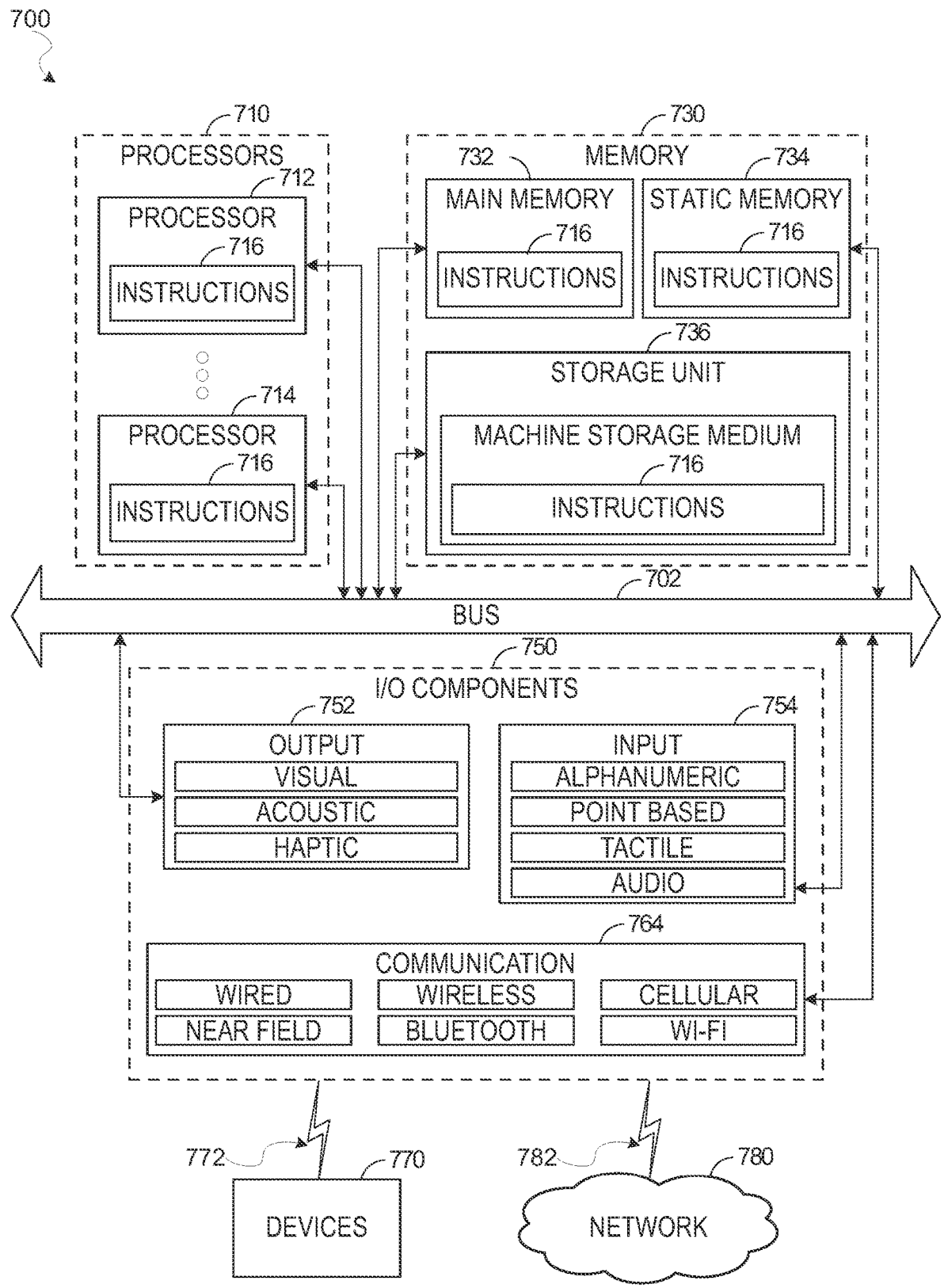
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implement portions of the data flows described herein. In this way, the instructions 716 transform a general, non-programmed machine into a particular machine 700 (e.g., the remote computing device 106, the access management system 118, the compute service manager 112, the execution platform 114, the access management system 110, the Web proxy 120, remote computing device 106) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the remote computing device 106, the access management system 118, the compute service manager 112, the execution platform 114, the access management system 110, the Web proxy 120, and the devices 770 may include any other of these systems and devices.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving a statement defining an object definition of a database entity stored in a network-based data system; parsing, by at least one hardware processor, the statement to determine a target state of the database entity; obtaining a current state of the database entity from a metadata database in the network-based data system; comparing the target state and the current state of the database entity to determine a set of changes; generating a plurality of execution steps based on the set of changes; and executing the plurality of execution steps using a single transaction with the metadata database Example 2. The method of example 1, wherein the statement comprises a declarative statement defining the target state of the database entity without including a specific action.

Example 3. The method of any of examples 1-2, wherein the plurality of execution steps includes a first execution step and a second execution step, the first execution step including a first pre-execute component, a first commit component, and a first post-execute component, and the second execution step including a second pre-execute component, a second commit component, and a second post-execute component.

Example 4. The method of any of examples 1-3, wherein the first pre-execute component includes a plurality of operations.

Example 5. The method of any of examples 1-4, wherein the first pre-execute component, the first commit component, the second pre-execute component, and the second pre-execute component share the single transaction.

Example 6. The method of any of examples 1-5, wherein the database entity comprises a table.

Example 7. The method of any of examples 1-6, wherein database entity comprises a task.

Example 10. A system comprising: one or more processors of a machine; and a memory storing instructions that, when executed by the one or more processors, cause the machine to perform operations implementing any one of example methods 1 to 7.

Example 11. A machine-readable storage device embodying instructions that, when executed by a machine, cause the machine to perform operations implementing any one of example methods 1 to 7.

What is claimed is:

1. A method comprising:
receiving a statement defining an object definition of a database entity stored in a network-based data system;
parsing, by at least one hardware processor, the statement to determine a target state of the database entity;
obtaining a current state of the database entity from a metadata database in the network-based data system;
comparing the target state and the current state of the database entity to determine a set of changes;
generating a plurality of execution steps based on the set of changes, each execution step comprising a pre-execute sub-step, a commit sub-step, and a post-execute sub-step; and
executing the pre-execute sub-steps and commit sub-steps for the plurality of execution steps using a single transaction with the metadata database so that changes to the database entity corresponding to each of the plurality of execution steps become visible to a user at a same time and intermediate changes between the plurality of execution steps are not visible to the user, the post-execute sub-steps being performed without interacting with the metadata database.

2. The method of claim 1, wherein the statement comprises a declarative statement defining the target state of the database entity without including a specific action.

3. The method of claim 1, wherein the pre-execute substep of a first execution step comprises a plurality of operations.

4. The method of claim 1, wherein the database entity comprises a table.

5. The method of claim 1, wherein database entity comprises a task.

6. A machine-storage medium embodying instructions that, when executed by a machine, cause the machine to perform operations comprising:
- receiving a statement defining an object definition of a database entity stored in a network-based data system;
- parsing, by at least one hardware processor, the statement to determine a target state of the database entity;
- obtaining a current state of the database entity from a metadata database in the network-based data system;
- comparing the target state and the current state of the database entity to determine a set of changes;
- generating a plurality of execution steps based on the set of changes, each execution step comprising a pre-execute sub-step, a commit sub-step, and a post-execute sub-step; and
- executing the pre-execute sub-steps and commit sub-steps for the plurality of execution steps using a single transaction with the metadata database so that changes to the database entity corresponding to each of the plurality of execution steps become visible to a user at a same time and intermediate changes between the plurality of execution steps are not visible to the user,
- the post-execute sub-steps being performed without interacting with the metadata database.

7. The machine-storage medium of claim 6, wherein the statement comprises a declarative statement defining the target state of the database entity without including a specific action.

8. The machine-storage medium of claim 6, wherein the pre-execute substep of a first execution step comprises a plurality of operations.

9. The machine-storage medium of claim 6, wherein the database entity comprises a table.

10. The machine-storage medium of claim 6, wherein database entity comprises a task.

11. A system comprising:
- at least one hardware processor; and
- at least one memory storing instructions that, when executed by the at least one hardware processor, cause the at least one hardware processor to perform operations comprising:
- receiving a statement defining an object definition of a database entity stored in a network-based data system;
- parsing, by at least one hardware processor, the statement to determine a target state of the database entity;
- obtaining a current state of the database entity from a metadata database in the network-based data system;
- comparing the target state and the current state of the database entity to determine a set of changes;
- generating a plurality of execution steps based on the set of changes, each execution step comprising a pre-execute sub-step, a commit sub-step, and a post-execute sub-step; and
- executing the pre-execute sub-steps and commit sub-steps for the plurality of execution steps using a single transaction with the metadata database so that changes to the database entity corresponding to each of the plurality of execution steps become visible to a user at a same time and intermediate changes between the plurality of execution steps are not visible to the user,
- the post-execute sub-steps being performed without interacting with the metadata database.

12. The system of claim 11, wherein the statement comprises a declarative statement defining the target state of the database entity without including a specific action.

13. The system of claim 11, wherein the pre-execute substep of a first execution step comprises a plurality of operations.

14. The system of claim 11, wherein the database entity comprises a table.

15. The system of claim 11, wherein database entity comprises a task.

* * * * *